United States Patent [19]

Mäkinen

[11] Patent Number: 4,628,732
[45] Date of Patent: Dec. 16, 1986

[54] CONNECTING DEVICE FOR MEASURING INSTRUMENTS

[75] Inventor: Veikko Mäkinen, Tampere, Finland
[73] Assignee: Valmet Oy, Tampere, Finland
[21] Appl. No.: 783,496
[22] Filed: Oct. 3, 1985
[51] Int. Cl.⁴ ............................................. G01L 19/14
[52] U.S. Cl. .................................................. 73/432.1
[58] Field of Search ................ 73/432 B, 432 R, 756, 73/86, 863.85, 32 R, 32 A; 374/208, 209; 324/438 PH

[56] References Cited

U.S. PATENT DOCUMENTS

| | | | |
|---|---|---|---|
| 2,780,094 | 2/1957 | Fink | 73/432 B |
| 4,091,672 | 5/1978 | Amrine et al. | 374/208 |
| 4,096,754 | 6/1978 | Beveridge, Jr. et al. | 73/432 B |
| 4,327,586 | 5/1982 | Goddard | 73/432 B |
| 4,495,810 | 1/1985 | Tessarzik et al. | 73/432 B |

Primary Examiner—Stewart J. Levy
Assistant Examiner—Robert R. Raevis
Attorney, Agent, or Firm—Pollock, Vande Sande & Priddy

[57] ABSTRACT

A connecting device for measuring instruments includes a body member attached to a member which forms a boundary surface of a process. The body member has an aperture therein for communication with the process. The process is measured through the aperture by a measuring instrument affixed to the connecting device. The measuring instrument is affixed to a selector member mounted movably with respect to the body member. The selector member has a hole communicating with the aperture of the body in the measuring position of the connecting device. The selector member has a closing surface closing the aperture of the body in the closed position of the connecting device.

20 Claims, 15 Drawing Figures

CONNECTING DEVICE FOR MEASURING INSTRUMENTS

FIELD OF THE INVENTION

The invention relates to a connecting device for measuring instruments including a body attached to the boundary surface of a process, the body comprising an aperture or the like in connection with the process through which aperture a process is measured by a measuring instrument affixed to the connecting device.

BACKGROUND OF THE INVENTION

Several kinds of measurements are carried out today in the process industry. These measurements require the direct or indirect connection of the measuring instrument such as the sensor, pressure mediator or the like with the process substance. The measuring instrument can be brought into contact with the process substance in several ways. The most simple way for mounting for example a sensor in its place is to attach by welding the sleevelike body of the connecting device to the boundary surface of the process, for example to the outer surface of a tube. The sleevelike body is most suitably provided with an internal threading or a fixing flange and the boundary surface of the process is provided with an aperture at the body. The sensor is fitted through the sleevelike body into contact with the process substance and it is secured thereto for example by means of external threading. The sensor is thus directly connected with the process. Other connecting devices known in the art include devices, which are connected with the process so that a shut-off valve is disposed between the body of the connecting device and the process. By means of this valve the contact between the process substance and the connecting device can be shut off when necessary. This kind of an arrangment for connecting a device for measuring instruments is disclosed in CH-patent publication No. 521,657. The sensor in the connecting device is movable in its longitudinal direction. To start the measurement the shut-off valve must first be opened and the sensor is then moved in its longitudinal direction through the hole of the shut-off valve to its front position into contact with the process. In a corresponding manner, when finishing the measurement the sensor must be moved in its longitudinal direction out of the hole of the valve to its back position and the valve is then closed.

A connecting device which is connected directly with the process and having a sensor attached to its body, which is in turn fixed to the boundary surface of the process has a disadvantage, in that replacement or maintenance of the measuring instrument cannot be carried out without disturbing the process itself. Before the actual replacement or maintenance work of the sensor can be started, the process must be interrupted at least in the vicinity of the connecting device. The connecting device equipped with a shut-off valve has a disadvantage, that a relatively large number of assembly parts are required. First, a fixing member attached to the boundary surface of the process is required. The valve is affixed to this fixing member. The actual connecting device, which engages the sensor is then attached to the valve. The use of this measuring arrangement is laborious, because the sensor and the shut-off valve must be moved separately to accomplishing the connection between the sensor and the process substance or to cut off the connection. Moreover, because the shut-off valve must always be located at a relatively long distance from the process, the connecting duct between the process substance and the shut-off valve can become clogged, if the process substance to be measured easily forms precipitates. In any case, the sensor must displace the process substance entering into the connecting channel and eventually also into the shut-off valve. This may involve great difficulties, when the sensor is connected with the process substance after the shut-off period, and in particular when high-pressure processes are measured.

SUMMARY OF THE INVENTION

The object of this invention is to provide a connecting device for measuring instruments, which overcomes the abovementioned problems. The object of this invention is thus to provide a simple and reliable connecting device for measuring instruments, which can be closed for replacement and maintenance of the sensor in such a way, that the process itself is not disturbed.

To achieve these purposes the connecting device according to the invention is mainly characterized in that the measuring instrument is affixed to a selector member movably mounted relative to the body, that the selector member has a hole or the like in connection with the measuring instrument, which hole is connected with the aperture of the body in the measuring position of the connecting device and that the selector member has a closing surface or the like at the aperture of the body in the closed position of the connecting device.

Figure 8:
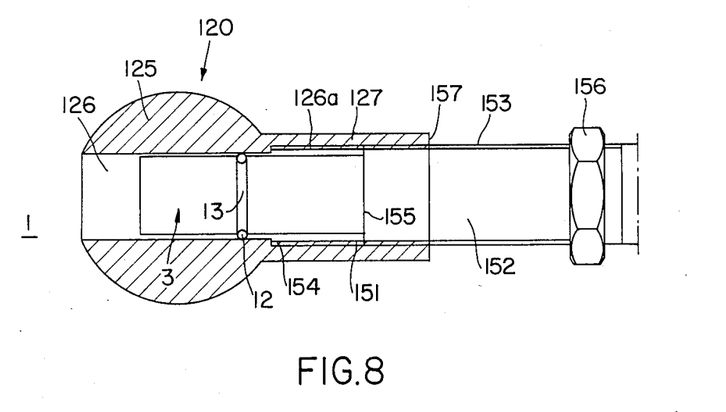
FIG. 8 is a sectional view of the selector member of FIG. 1 and including a sleeve portion.
Figure 9:
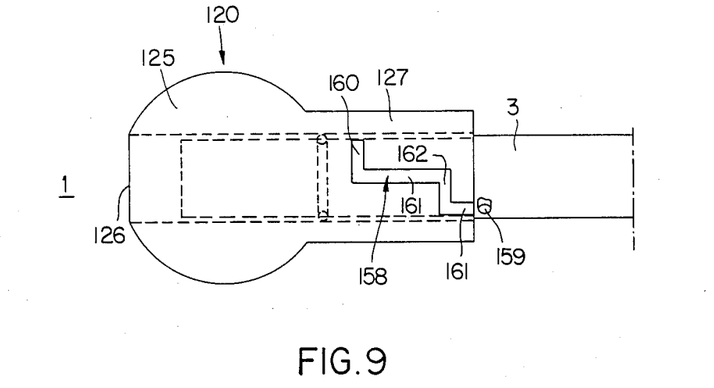
FIG. 9 is a sectional view of the selector member of the FIG. 1 embodiment showing one method for connection into the process substance.
Figure 10:
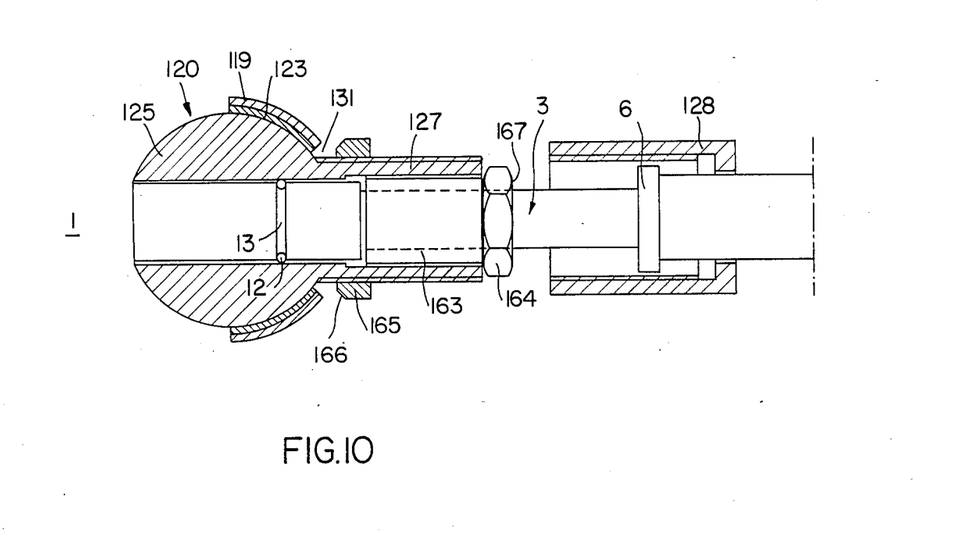
FIG. 10 shows a further embodiment of the FIG. 1 connecting device.

Some embodiments of the invention will now be described with reference to the accompanying drawings which show some preferred embodiments of the invention. In the drawings, FIGS. 1 to 7 show different embodiments of the connecting device according to the invention and FIGS. 8 to 10 show some embodiments of the attachment between the selector member and the measuring instrument employed to bring the measuring instrument into the process substance. As far as the reference numerals with three digits are concerned, the following system is applied. The first number refers to the number of the Figure in question and the following number with two digits refers to the actual part of the connecting device. Thus parts with similarities in function form a series of reference numerals, which differ from each other to indicate the Figure numbers in which they appear.

DESCRIPTION OF THE PREFERRED EMBODIMENTS

Figure 1:
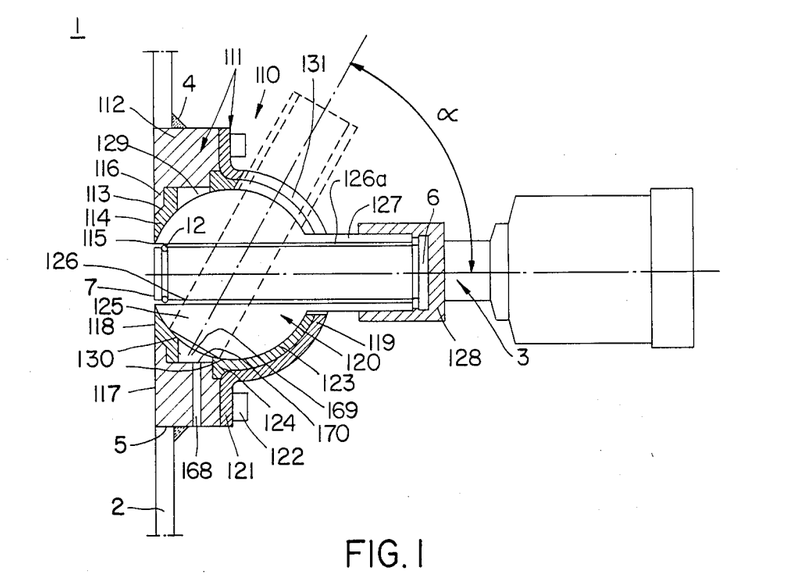
FIG. 1 is a sectional view of a first embodiment of the connecting device.

In FIG. 1 process and process substance are generally denoted by reference numeral 1, the properties of which such as the temperature, the density, the pH-value, the consistency or some other characteristic are measured. The process substance is limited by the boundary surface 2 of the process, which surface in this context can indicate for example a wall of the container around the process substance, a tube with the process substance flowing therein or a flange in connection with the container or a tubing containing the process substance. The measuring instrument 3 and in this case it is a sensor, but it can be also a pressure mediator or a corresponding member in connection with the process substance to measure one or several of the characteristics of the process substance. The measurement as such and the information given by the measuring instrument about the characteristics of the process substance and transferring this information are not included in the scope of this invention. Thus, these characteristics are not described in more detail. It is only emphasized that the connecting device according to the invention can always be designed in accordance with the basic idea of the invention so that the measuring instruments available on the market can be disposed in the connecting device.

The connecting device 110 for measuring instruments in accordance with the invention is attached to the boundary surface 2 of the process. In the embodiment of FIG. 1 a body 111 of the connecting device is welded at 4 to aperture 5 in the boundary surface of the process so that the inner surface of the body is on the same level with the inner surface of the boundary surface 2 of the process. The body 11 comprises preferably an annular shaped base portion 112, the welded joint 4 being between the peripheral surface of this base portion and the edge of the aperture 5. The base portion comprises an aperture 113 with a gasket 114 disposed therein, this gasket further comprises an aperture 115, through which the sensor 3 is in connection with the process substance. The gasket 114 can be made from plastic material, e.g. Teflon ®, which is a sealing material of great chemical and mechanical resistance. The gasket 114 is supported at its outer edge by flange 116 in base portion 112 to prevent gasket 114 from moving in the longitudinal direction of the sensor. The sealing flange 116 and gasket 114 are preferably of circular shape as viewed in the longitudinal direction. Base portion surface 117 and gasket surface 118 are directed toward the process direction and on substantially the same level with boundary inner surface 2 of the process.

According to the invention selector member 120 is fixed to body 111 by closure 119, which is secured to base portion 112 with bolts 122 at annular flange 121. Another gasket 123 is disposed between the closure 119 and selector member 120 and held against movement relative to the closure by collar 124 between base portion 112 and closure 119. The gasket is preferably made of Teflon ®. Closure 119 can be made for example from a platelike metallic material by deep drawing. The base portion 112 can preferably be made from stainless steel, which is machined to an annular shaped sealing flange 116, which provides space for the selector member and the recess for gasket collar 124.

In the embodiment shown in FIG. 1 selector member 120 comprises a measuring and closing portion 125 located substantially inside the body 111 and comprising a centrally positioned hole 126 for sensor 3. The selector member 120 further comprises a sleeve portion 127 arranged centrally of the central axis of the hole 126. The sensor is partially located in sleeve 127, which is used when fixing the sensor to the selector member 120 for example by means of barrel nut 128. Barrel nut 128 comprises an internal threading and sleeve 127 of selector member 120 has a corresponding external threading. Barrel nut 128 locks flange 6 in sensor 3 between the end surface of sleeve 127 of the selector member and the bottom of barrel nut 128.

The measuring and closing portion 125 is sphere shaped and the inner surface of gaskets 114 and 123 correspond essentially in shape to portion 125. A sealing effect is thus accomplished between portion 125 and parts 114 and 123 within housing 130 of body 111, this housing being essentially defined by the gasket inner surfaces.

In the position shown by solid lines in FIG. 1 the process is measured by sensor 3. Sensor 3 located in hole 126 of selector member 120 and particularly the end surface 7 thereof is at aperture 115 of body 111, the sensor being thus in connection with the process. In accordance with the invention selector member 120 is movably fitted relative to body 111 so that selector member 120 and particularly measuring and closing portion 128 is rotatable within housing 130 of body 111, which housing is essentially limited by gaskets 114 and 123. The closed position of portion 125 is shown in FIG. 1 by interrupted lines. In this position spherical outer surface 129 of portion 125 is positioned at aperture 115 of body 111. The connecting device is now in closed position and the sensor can be checked or detached for maintenance or replacement from the connecting device by loosening barrel nut 128. Closure 119 of body 111 and spherical gasket 123 are provided with slots 131 in coincidence with each other which provide rotary movement. The width of slots 131 corresponding substantially to the diameter of sleeve portion 127. The rotary movement between the closed and measuring positions, shown by angle α in FIG. 1, can be carried out in the direction of these slots. Part of the outer surface 129 of spherical measuring and closing portion 125 acts thus as a closing surface. The entire outer surface, however, acts as a guide for movement within housing 130 of body 111. Slots 131 in closure 119 and gasket 123 are preferably disposed in horizontal position when mounting connecting device 110. In this case the external disturbing factors such as vibration cannot change the position of the selector member. The embodiment shown in FIG. 1 can also be provided with a locking device which prevents accidental changes of the position of selector member 120.

Selector member 120 in FIG. 1 can be manufactured for example from stainless steel by turning spherical part 125, which is provided with a bore 126 extending therethrough. Sleeve portion 127 can be subsequently mounted for example threadably in this spherical part so that hole 126a of the sleeve portion is located centrally of hole 126 of part 125 and is also of equal diameter. Another alternative for making selector member 120 of FIG. 1 is to shape part 125 from plastic material for example by injection molding in a spherical hollow mold, wherein a metal tube of substantially greater length than the diameter of the spherical part is disposed. In that case the portion of the tube extending outwardly of the spherical part makes up sleeve 127. The portion of the tube remaining within the spherical part comprises flanges or like components extending outwardly from the outer surface of the tube for the purpose of improving the attachment between the tube and the plastic material.

Further in FIG. 1 base portion 112 of body 111 is provided with a bore 168. Bore 168 connects housing 130 of body 111 with outer surface of body 111. The condition of the sensor 3 can be inspected, when the sensor is in the position shown by interrupted lines in FIG. 1 and end 7 of sensor 3 is in connection with the space 169 within housing 130 between gaskets 114 and 123. Inner end 170 or the bore is in connection with the space 169. In this case ordinary measurements are not carried out with sensor 3 and closing surface 129 of selector member 120 is at the aperture 115 of body closing thus the connecting device. The inspection device can be connected to the outer end of bore 168 by suitable means. When the bore is not used for inspection as described above, it can be closed.

Figure 2A:
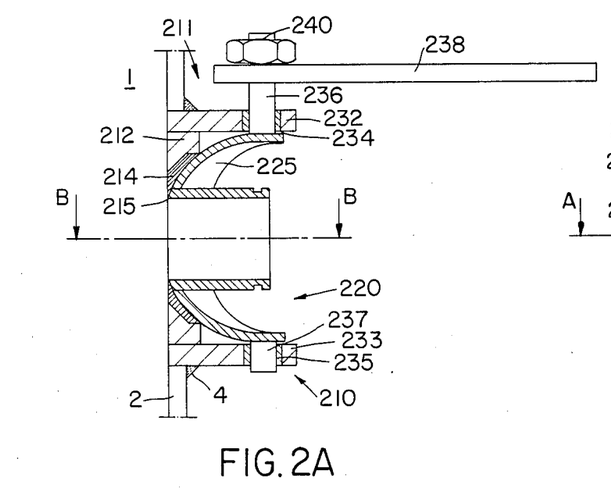
FIG. 2A is a sectional view of another embodiment of the connecting device taken along line A—A of FIG. 2B.
Figure 2B:
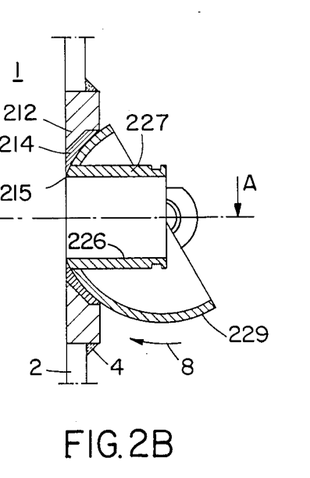
FIG. 2B is a sectional of another embodiment of the connecting device taken along line B—B of FIG. 2A.

FIGS. 2A and 2B show another embodiment of the connecting device according to the invention, without measuring instrument disposed therein. Body 211 comprises base portion 212 and gasket 214 with aperture 215 positioned centrally thereof. In this embodiment the opposite sides of base portion 212 of body 211 are provided with supporting brackets 232 and 233 extending outwardly of the boundary surface of the process. Pivots 236 and 237 are journalled in bearings 234 and 235 supported by the brackets. The measuring and closing portion 225 of the selector member is mounted between these pivots and is thus pivotable about an axis of rotation 240 between the pivots. Lever 238 is affixed to pivot 236 for bringing the connecting device 210 from the position shown in FIGS. 2B and 2B, wherein the hole 226 of the sleeve 227 of the selector member 220 is at the aperture 215 of the body 211, brought into the closed position by rotating it in the direcion of arrow 8. In closed position closing surface 229 of selector member 220 on the side of sleeve 227, as viewed in the direction of the axis of rotation, is at aperture 215 of body 211.

In this embodiment selector member 220 has the shape of a shell structure. The outer surface of this structure is a surface of sphere or revolution, at least the portion contacting the gasket 214. The shell structure can be made for instance from platelike metallic material by deep drawing and by providing it with a hole, whereon the sleeve 227 for fixing the sensor is mounted. It is preferable to dispose the fixing sleeve 227 near the outer edge of measuring and closing portion 225, as viewed in the direction of the axis of rotation 240. In this case the length of the closing surface is sufficient even if the length of the periphery of the selector member 220 is a semicircle, as viewed in the direction of the axis of rotation.

Fixing sleeve 227 may be provided with a fixing arrangement according to FIG. 1 for mounting measuring instrument 3. Moreover, outer end of the fixing sleeve can be equipped with a flange element extending outwardly thereof and used in attaching locking flange 6 of the sensor. Further, as shown in FIGS. 2A and 2B, the sleeve outer surface may be surrounded by a mounting groove, wherein is fixed a two-sided fixing ring having an inwardly directed V cross section the first leg being fastened to the groove and the second leg to a correspondingly shaped groove in the sensor.

Figure 3:
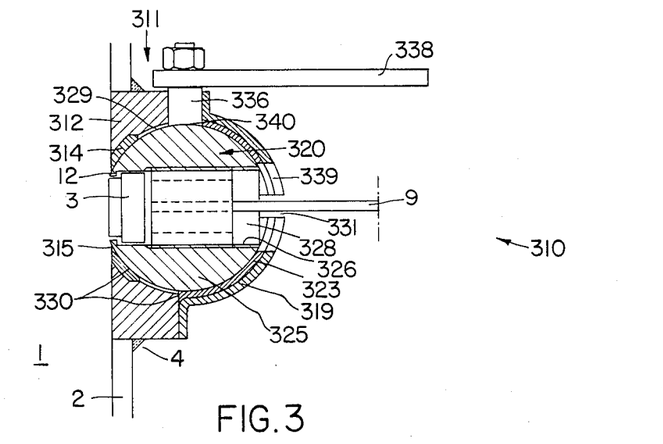
FIG. 3 is a sectional view of still another embodiment of the connecting device.

FIG. 3 shows a third embodiment of the connecting device according to the invention combining the features of the aforementioned embodiments by having a spherically shaped selector member 320 which includes a central hole 326 for engaging measuring instrument 3. The embodiment shown in FIG. 3 is preferred for measuring instruments of smaller size. Such instruments include for example a pressure mediator 3 as shown in the Figure. This instrument mediates along a capillary tube 9 a measuring signal corresponding to the pressure of the process. Measuring instrument 3 is fastened to hole 326 of measuring and closing portion 325 of selector member 320 by fixing nut 328. Nut 328 comprises an external threading, which fits within the internal threading of the hole 326. Closure 319 and gasket 323 are provided with an aperture 339 for mounting in measuring instrument 3 and fixing nut 328. Slot 331 is provided for rotating the connecting device by lever 338 which is affixed to pivot 336 and journalled within body 311 and extends therethrough. The pivot is then affixed to the portion 325. By pivoting the lever 338 in a plane perpendicular to the Figure, the closing surface of the selector member (a portion of the outer surface 329 of the spherical selector member) located behind the sensor as viewed in the direction of FIG. 3, assumes a position wherein it is at the aperture 315 of the body 311. The axis of rotation 340 of the selector member coincides thus with the central axis of the pivot 336.

Figure 4A:
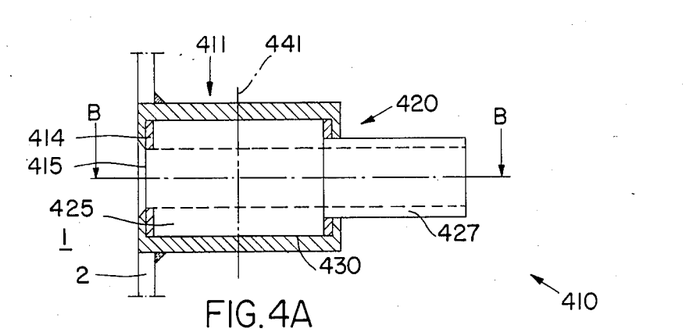
FIG. 4A is a sectional view of the connecting device without a measuring instrument taken along line A—A of FIG. 4B.
Figure 4B:
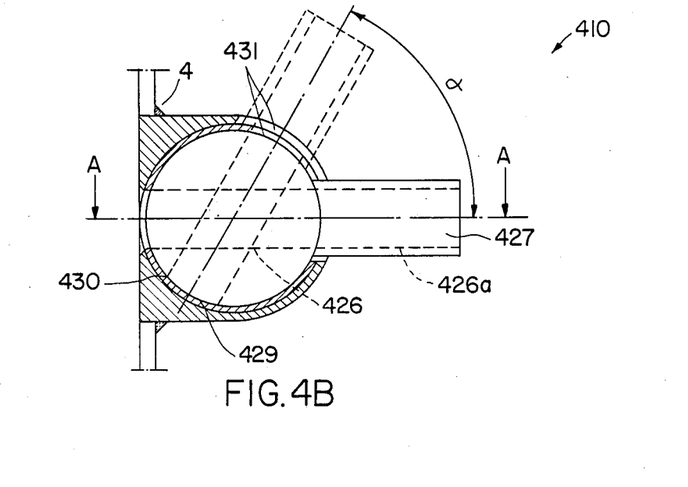
FIG. 4B is a sectional view of the connecting device without a measuring instrument taken along line B—B of FIG. 4A.

FIGS. 4A and 4B show a fourth embodiment of the connecting device according to the invention without a measuring instrument. This embodiment is a modification of the FIG. 1 embodiment. Surface 429 of measuring and closing portion 425 of selector member 420 has the shape of a cylinder. Body 411 and especially the housing 430 thereof, wherein the portion 425 is rotatable between the measuring and closed positions, is likewise a cylinder. Between portion 425 and housing 430 of body 411 is a substantially cylindrically shaped gasket 414. Body 411 and gasket 414 are provided with a slot 431, wherein sleeve 427 of selector member 420 is movable between the measuring and closed positions in a plane perpendicular to central axis 441 of measuring and closing portion 425 of cylindrically shaped gasket 414. Body 411 and gasket 414 are provided with an aperture 415, through which the measuring instrument disposed in hole 426 and 426a of the selector member is in connection with the process in measuring position.

Figure 5A:
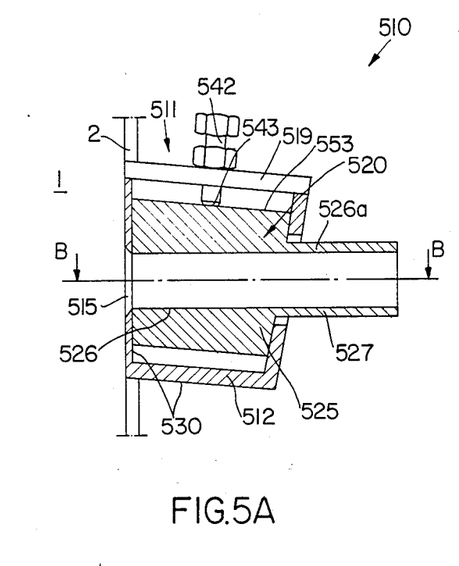
FIG. 5A is a sectional view of still a further embodiment of the connecting device without a measuring instrument taken along line A—A of FIG. 5B.
Figure 5B:
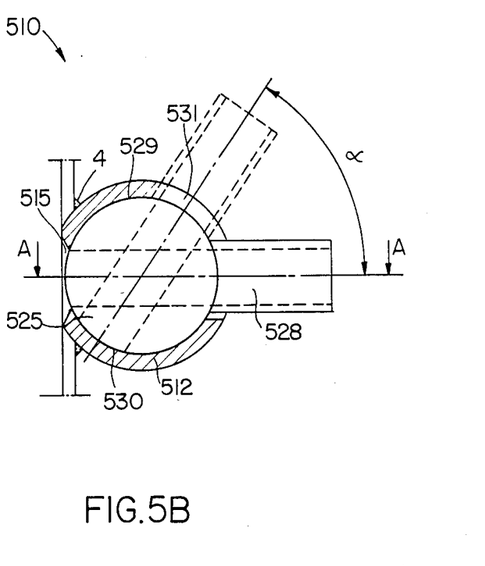
FIG. 5B is a sectional view of still a further embodiment of the connecting device without a measuring instrument taken along line B—B of FIG. 5A.

FIGS. 5A and 5B show a fifth embodiment of the connecting device according to the invention without the measuring instrument. In this embodiment surface 529 of measuring and closing portion 525 of selector member 520 has a truncated cone shape. Housing 530 in base portion 512 of body 511 is therefore similarly conically shaped. Portion 525 is disposed into housing 530 so, that the central axes of these conical shapes coincide with each other. When the connecting device of FIGS. 5A and 5B is mounted so that the rotary movement between the measuring and closed positions is performed is a horizontal plane, a very favorable sealing effect exists between housing 530 of body 511 and portion 525, since portion 525, influenced by the force of gravity, is pressed against the inner surface of the housing. In this case, omission of the gaskets presented in connection with the preceding embodiments can be considered. Closure 519 of body 511 has a locking screw 542 extending through closure 519. End surface 543 of screw 542 and the surface 553 of portion 525 are pressed against each other when the selector member is in the measuring or closed position. Accidental changes of position are thus prevented. Base portion 512 of the body can be made for example by turning from stainless steel and is equipped with aperture 515 for the measuring instrument and slot 531 for rotary movement of the selector member.

Figure 6A:
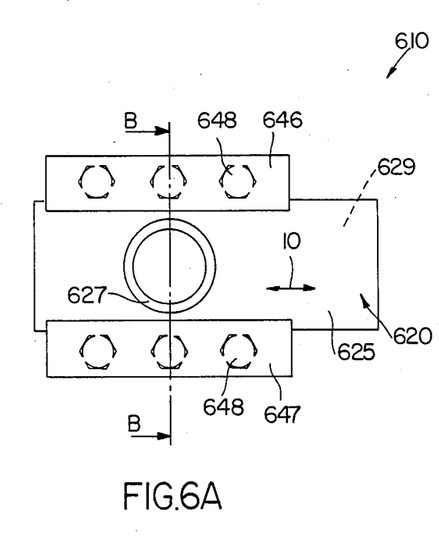
FIG. 6A is a top view of further embodiment of connecting device.
Figure 6B:
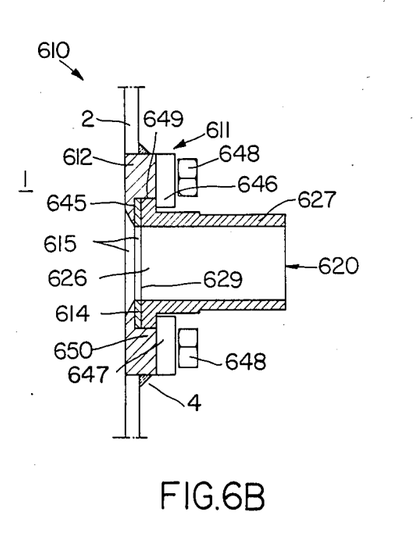
FIG. 6B is a sectional view of the connecting device taken along line B—B of FIG. 6A.

FIGS. 6A and 6B show a sixth embodiment of the connecting device according to the invention. Base portion 612 of body 611 comprises a longitudinally extending recess 645. Slabs 646 and 647 are attached to both edges of the recess for example by screws 648. The slabs extend partially over the recess forming grooves 649 and 650 on the edges of the recess. The selector member is in this case a plate movable along grooves 649 and 650 and supported at its edges therein. The plate is provided with a hole 626, at which a sleeve 627 is mounted for fixing the sensor. Interposed between selector member 620 and recess 645 of the body is gasket 614. Gasket 614, and body 611, have an aperture 615, through which the measuring instrument is connected to process 1 in the position shown in FIG. 6B. Selector member 620 is movable between grooves 649 and 650 in the direction of arrow 10 from the measuring position into the closed position and vice versa. When the selector member is in the other extreme position of its movement following a straight line path, inner surface 629, illustrated by FIG. 6B and acting as a closing surface on the selector member 620, is at aperture 615 of body 611.

Figure 7A:
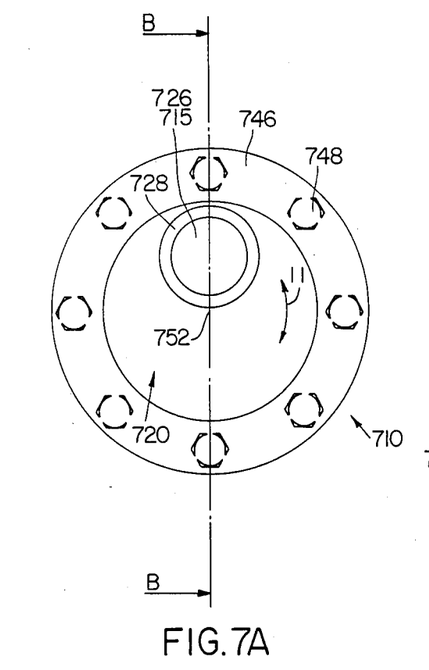
FIG. 7A is a top view of an alternative embodiment showing a platelike selector member.
Figure 7B:
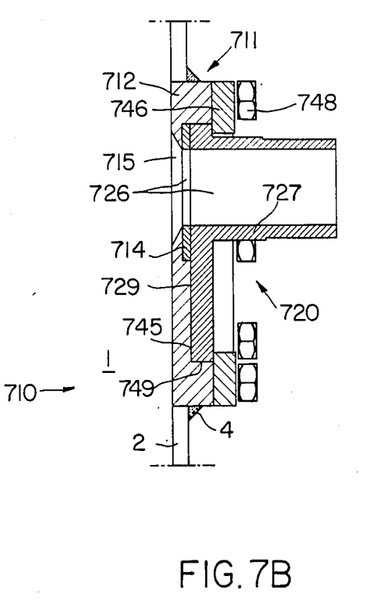
FIG. 7B is a sectional view of the FIG. 7A embodiment taken along line B—B.

FIGS. 7A and 7B show an alternative embodiment, which employs an essentially platelike selector member. Base portion 712 of body 711 is provided with circular recess 745 surrounded by annular ring 746 fastened with bolts 748 to the base portion. The internal diameter of this annular ring is smaller than that of the recess. As a result an annular groove 749 is formed in the body. This groove is arranged to engage the edge of the essentially platelike selector member 720. The groove simultaneously acts as a guide for the selector member. Body 711 is equipped with aperture 715 positioned eccentricity of the center of circular groove 745. Selector member 720 and gasket 714 are equipped with a hole 726 so that aperture 715 in the body and hole 726 in the selector member are at least partially in coincidence with each other in the measuring position. For fixing the measuring instrument, selector member 720 is equipped with a fixing sleeve 727, as described in the preceding embodiments. The central axis of the sleeve is substantially perpendicular to the main plane of platelike selector member 720 and disposed to coincide with hole 726. Body 711 is further provided with an annular groove for gasket 714. From the measuring position shown in FIG. 7A the connecting device can be brought into closed position by rotating the selector member in annular groove 749 about central axis 752 according to arrow 11. Inner surface 729 acting as a closing surface on selector member 720 will thus, as rotary movement continues, move at aperture 715 of body 711 closing the connection between the process 1 and the measuring instrument.

In the embodiment shown by FIGS. 6A and 6B and FIGS. 7A and 7B the thickness of the plate material in the selector members 620 and 720 can be selected with regard to grooves 649 and 749 so that the final tightening of fastening bolts 648 and 748 of slabs 646 and 647 and annular ring 746 locks the selector member in relation to the body.

FIGS. 1 and 3 show further the disposition of a sealing member, such as a packing ring 12 between measuring instrument 3 and hole 126, 326 of the selector member.

Accompanying FIGS. 1–7 illustrate embodiments, wherein the body of the connecting device is affixed to the boundary surface of the process at 4 by welding. However, other alternatives are also apparent for a man skilled in the art, such as fixing with bolts etc.

Shifting between measuring and closed positions can be performed by gripping the measuring instrument and/or the sleeve portion, when a separate lever is not provided.

FIGS. 8–10 show schematically some embodiments for mounting the measuring instrument in the selector member. By employing these embodiments the measuring instrument can be brought partially into the process substance, when the connecting device is in the measuring position. This is due to the possibility of moving the measuring instrument in the longitudinal direction of the selector member hole back and forth. In particular, when the measuring instrument is entirely within the selector member hole, the connecting device can be brought into closed position. The measuring instrument can be brought into the process substance by moving it in the longitudinal direction the selector member past the front part of the selector member hole and past the base portion of the body. Before the connecting device is brought into the closed position, the sensor must be moved completely back into the selector member hole. FIGS. 8–10 show this mode substantially applied to the embodiment of the selector member illustrated by FIG. 1.

FIG. 8 is a sectional view of the selector member incorporating sleeve portion 127 having a hole 126a with an internal threading 151 therein. An external sleeve 152 with an external threading 153 is fixed on sensor 3. Threading 153 fits within the internal threading 151 of sleeve portion 127. By rotating the sensor at the sleeve 152 mounted thereon the sensor can be moved in the longitudinal direction of the selector member hole 126 towards the process 1 until end surface 155 of sleeve 152 on sensor reaches bottom 154 of hole 126a in sleeve portion 127. The front part of sensor 3 is in this position in the process substance. An external locking nut 156 is disposed to the sleeve 152. The position of the sensor is locked by bringing nut 156 into contact with end surface 157 of sleeve portion 127. Sensor 3 has also an annular groove 13 for packing ring 12 acting as a sealing member between hole 126 and the sensor.

FIG. 9 shows an embodiment, where sleeve portion 127 of selector member 120 is equipped with a guiding slot 158 and the outer surface of the sensor is correspondingly equipped with a guiding pin fitting within the slot. Slot 158 comprises in this embodiment two portions 160 and 162 directed transversally to the longitudinal direction of the hole of sleeve portion 127. When the guiding pin is in one or the other of these slots, the sensor is rotated. Further slot 158 comprise two portions 161 parallel to the longitudinal direction of the hole of sleeve portion 127. When the guiding pin is in one or the other of these slots, the sensor can be moved in the longitudinal direction of the selector member. Parts 159 and 160 thus define the position of the sensor in the longitudinal direction of the selector member hole.

FIG. 10 shows a further embodiment, where sleeve portion 127 is provided with an internal threading. A sleeve 163 having an external threading fitted within the internal threading is rotatable in sleeve portion 127 and is thus movable along the longitudinal direction thereof. Sleeve 163 is further equipped with a rotating nut 164. When sleeve 163 is rotated in sleeve portion 127 of selector member 120, the final longitudinal position of sensor 3, where flange 6 on the sensor contacts the surface 167 of the rotating nut, is defined by the position of rotating nut end surface 167. The sensor is locked to the connecting device with barrel nut 128 by locking flange 6 between the bottom of barrel nut 128 and the end surface 167 of the rotating nut 164. The barrel nut is provided with an internal threading, sleeve portion 127 of selector member 120 being provided with an external threading fitting therein. FIG. 10 shows further a locking nut 165 chamfered at its edge 166, to fit within slot 131 of the connecting device. By means of nut 165 selector member 120 can be locked into position by tightening the nut into slot 131 after the position of the selector member has been changed. Chamfered edge 166 contacts thus the edges of slot 131 consisting of the edges of closure 119 and gasket 123.

I claim:

1. A connecting device for measuring instruments comprising:
    a body member arranged to be attached to a member which defines a boundary surface of a process said body member defining an aperture therein;
    a selector member having a measuring instrument affixed thereto, said selector member being movable with respect to said body member, said selector member having a hole therethrough;
    wherein said hole is adapted for communication with said aperture, said aperture being adapted for communication with the process for permitting passage of the measuring device through said hole and said aperture to measure characteristics of the process in the measuring position of said connecting device, and wherein said selector member comprises a closing surface for covering said aperture of said body and closing said aperture in the closed position of said connecting device.

2. A connecting device according to claim 1, wherein said closing surface of said selector member is an arcuate surface and wherein an inner surface of said body member coacting with said closing surface has a corresponding shape at least in the portion contacting said closing surface, said measuring instrument being movable between the measuring and closed positions so that an angle α exists between longitudinal directions of said hole of said selector member in the measuring and closed positions.

3. A connecting device according to claim 2 wherein a measuring and closing portion is incorporated in said selector member having a substantially spherical shape, the measuring instrument being at least partially disposed into a hole arranged in said measuring and closing portion.

4. A connecting device according to claim 3 wherein said body member comprises a housing surrounding substantially said measuring and closing portion, said housing having a shape corresponding substantially to the shape of an outer surface of said measuring and closing portion, said body member being provided with a slot for permitting rotary movement at angle α of said selector member.

5. A connecting device according to claim 4 wherein a sleeve portion is affixed to said measuring and closing portion, the hole of said sleeve portion being in communication with the hole of said measuring and closing portion, said sleeve portion being adapted to move in the longitudinal direction of said slot and being provided with members for fixing the measuring instrument in said selector member.

6. A connecting device according to claim 2, wherein a measuring and closing portion of said selector member has a shell structure which is provided with an arcuate closing surface wherein a sleeve for fixing the measuring instrument is attached to said shell structure, and the hole of said sleeve communicates with said aperture of said body member in the measuring position.

7. A connecting device according to claim 1, wherein said closing surface of said selector member is an arcuate surface and wherein said body member comprises a gasket coacting with and closing surface, said gasket having a corresponding shape at least in its portion coacting between the measuring and closed positions so that an angle α exists between longitudinal directions of said hole of said selector member in the measuring and closed positions.

8. A connecting device according to claim 1, wherein said closing surface of said selector member is a planar, substantially platelike surface, the measuring instrument being movable between the measuring and closed positions so that the longitudinal direction of said hole of said selector member remains substantially the same between the measuring and closed positions.

9. A connecting device according to claim 8, wherein movement follows a straight line path and wherein said body member is provided with straight guiding grooves adapted for guiding said selector member at its opposite edges.

10. A connecting device according to claim 8, wherein said platelike selector member has a circular shape, wherein said movement is rotary, and wherein said body member is provided with an annular guiding groove adapted for guiding said selector member.

11. A connecting device according to claim 8 wherein said selector member is provided with a sleeve for fixing the measuring instrument thereto for communication with said aperture of said body member through a hole of said sleeve in the measuring position.

12. A connecting device according to claim 1 wherein said selector member is journalled in said member body with at least one pivot, said pivot having a lever which is affixed thereto for rotating between a measuring and closing portion in a plane perpendicular to the central axis of said pivot.

13. A connecting device according to claim 1 wherein a gasket made of Teflon ® is interposed between said selector member and of said body member.

14. A connecting device according to claim 1 wherein moving means is arranged in said hole of said selector member, said moving means permitting movement of the measuring instrument in the longitudinal direction of said hole for moving the measuring instrument into the process in the measuring position of said connecting device and into the selector member in order to bring the connecting device into the closed position.

15. A connecting device according to claim 14 wherein a threading is arranged in said hole of said selector member and wherein the outer surface of the measuring instrument has a correspondingly dimensioned external threading whereby the measuring instrument is partially rotatable in said hole into the process.

16. A connecting device according to claim 14 wherein said selector member comprises a sleeve portion in which a slot is provided in said sleeve portion wherein on the outer surface of the measuring instrument a guiding pin fitting within said slot is disposed at least partially in the longitudinal direction of said sleeve portion for bringing the measuring instrument into the process through the guiding effect accomplished by said slot and said guiding pin.

17. A connecting device according to claim 14, wherein a hole of said selector member is threaded and wherein a correspondingly threaded sleeve is disposed in said hole of said selector member, the end surface of said sleeve coacting with a stop member forming a flange on the measuring instrument for defining the position of the measuring instrument, said flange contacting said end surface of said sleeve.

18. A connecting device according to claim 17 wherein a packing ring is interposed between the measuring instrument and said hole of said selector member.

19. A connecting device according to claim 1 wherein a packing ring is interposed between the measuring instrument and said hole of said selector member.

20. A connecting device according to claim 1 wherein said body member is provided with a bore, said bore extending through said body member and connecting a space within said body member with the surface of said body member outside the boundary surface of the process, said space being arranged to communicate with the measuring instrument in the closed position.

* * * * *